United States Patent [19]

Davis

[11] Patent Number: 4,579,653

[45] Date of Patent: Apr. 1, 1986

[54] SIDE-BY-SIDE FUEL PROCESSOR APPARATUS

[75] Inventor: Leland L. Davis, Saline, Mich.

[73] Assignee: Davco Manufacturing Corporation, Ann Arbor, Mich.

[21] Appl. No.: 641,866

[22] Filed: Aug. 17, 1984

[51] Int. Cl.$^4$ .............................. B01D 27/00
[52] U.S. Cl. ........................ 210/86; 210/136; 210/184; 210/306; 210/313; 123/557
[58] Field of Search ............. 210/181, 182, 183, 184, 210/294, 306, 310, 312, 313

[56] References Cited

U.S. PATENT DOCUMENTS

| | | | |
|---|---|---|---|
| 939,418 | 11/1909 | Hisey | 210/306 |
| 1,372,828 | 3/1921 | Renn | 210/313 |
| 1,661,284 | 3/1928 | Fuqua et al. | 210/313 |
| 2,294,107 | 8/1942 | Beck | 210/184 |
| 4,091,265 | 5/1978 | Richards et al. | 219/501 |
| 4,354,946 | 10/1982 | Warlick | 210/184 |
| 4,368,716 | 1/1983 | Davis | 210/184 |
| 4,395,996 | 8/1983 | Davis | 123/557 |
| 4,421,090 | 12/1983 | Davis | 123/557 |
| 4,428,351 | 1/1984 | Davis | 210/184 |
| 4,437,986 | 3/1984 | Hutchins et al. | 210/184 |
| 4,477,345 | 10/1984 | Szlaga, Jr. | 210/184 |
| 4,477,715 | 10/1984 | Bell | 210/184 |

Primary Examiner—John Adee
Attorney, Agent, or Firm—Harness, Dickey & Pierce

[57] ABSTRACT

A fuel processor device particularly useful for separating water and other impurities from diesel fuel. The fuel processor according to the invention features a vertically elongated housing where fuel is initially transmitted wherein water and heavy particulates are removed therefrom. The housing includes a manually or automatically actuated drain valve, a fuel inlet fitting, and an optional heating device. After passing through the housing, the fuel is conducted to a particulate filter, preferably of the spin-on variety, which is mounted to a head which communicates with a fuel processing housing. The filter is positioned in side-by-side relation with the fuel processor housing. A first embodiment according to this invention describes the use of a horizontal elongated head which communicates the upper portion of the housing with a filter mounting pad. A second embodiment of this invention is substantially identical with the first except that the unit is invented such that the lower portion of the housing forms the horizontal extending filter mounting pad. Fuel processors according to this invention provide excellent water separation and particulate filtration performance and are particularly adapted to be installed where vertical height limitations are imposed.

20 Claims, 3 Drawing Figures

SIDE-BY-SIDE FUEL PROCESSOR APPARATUS

BACKGROUND AND SUMMARY OF THE INVENTION

This invention relates generally to fuel processing apparatus for diesel powered devices and particularly, to a fuel processor having a water separating and heating housing mounted in side-by-side relation to a removable filtration unit.

In the past when diesel fuel was plentiful and relatively inexpensive there were significantly fewer problems with the quality of diesel fuel because of the substantial competition between sellers of the fuel. Refineries, distributors, and retailers were careful to keep water out of the fuel, and they usually did not pump out the heavy settlings from the bottom of their fuel storage tanks. In more recent times, with shortages of oil, fuel suppliers can sell essentially all of their available oil with little difficulty. Additionally, fuel suppliers in the past have blended kerosene and other fuels with lower cold and pour points with diesel fuel to facilitate cold weather flow and use. Fuel allocations due to government regulations and oil shortages have now made it almost impossible to continue this practice. The result has been a distinct tendency toward lesser quality fuel containing substantially more impurities such as water and particulate materials which are very disruptive to proper operation of diesel engines and other diesel fuel consuming devices.

In order to overcome the above-mentioned fuel quality problems, operators of diesel equipment are incorporating fuel conditioning devices which serve as water separaters and/or impurity filters. Several of such devices are described in my issued U.S. Pat. Nos.: 4,368,716, 4,428,351, 4,395,996; 4,421,090; and by co-pending patent application, Ser. Nos.: 463,041 filed Feb. 1, 1983; 573,292, filed Jan. 23, 1984; and 624,413 filed June 25, 1984. These patents and patent applications are hereby incorporated by reference. In addition to the structures described by these reference patents and patent applications, it is further desirable to provide a fuel processor apparatus which can be mounted in locations where height limitations are imposed. As with any type of fuel processor, serviceability in terms of particulate filter replacement, and efficiency in removing water and other impurities are essential.

In view of the above, it is a primary object of this invention to provide a new and improved fuel processor apparatus for removing water and other impurities from diesel fuel. It is a further object to provide such a fuel processor device which can be mounted in locations where vertical height restrictions are imposed. Further objects of this invention include providing a fuel processor apparatus having an easily removed filter assembly and further, one which performs well in terms of water separation and particulate filtration performance.

The above principal objects of this invention are achieved by employing a housing for water separation and fuel heating which communicates via a head cavity with a particulate filter, preferably of the spin-on variety, which is aligned in substantially side-by-side relation with the water separation housing. In accordance with a first embodiment of this invention, the head cavity is provided in the vertically uppermost portion of the fuel processor device. According to a second embodiment of this invention, the fuel processor and filtration device are reversed from that of the first embodiment such that the head cavity is located at the vertically lower end of the fuel processor device.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
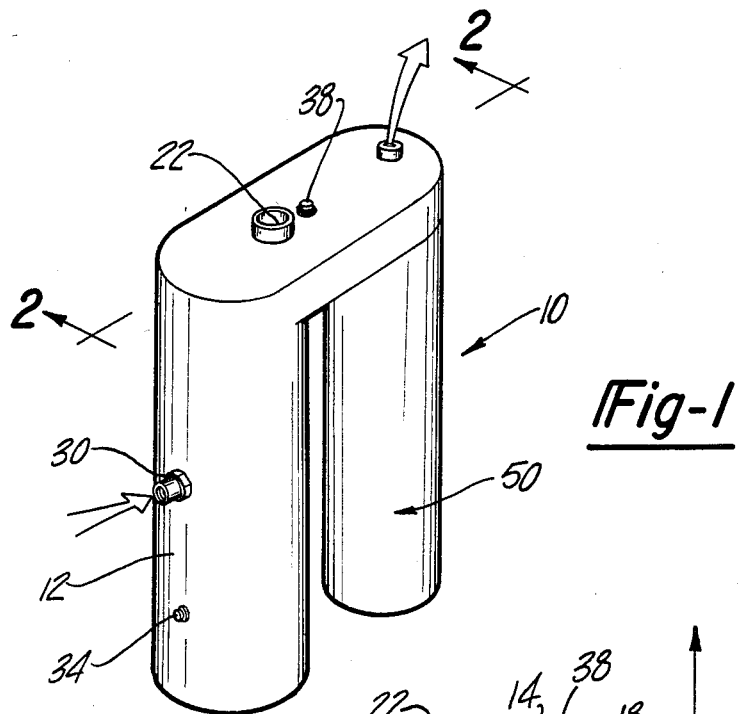
FIG. 1 is a pictorial view of a fuel processor device according to a first embodiment of this invention.
Figure 2:
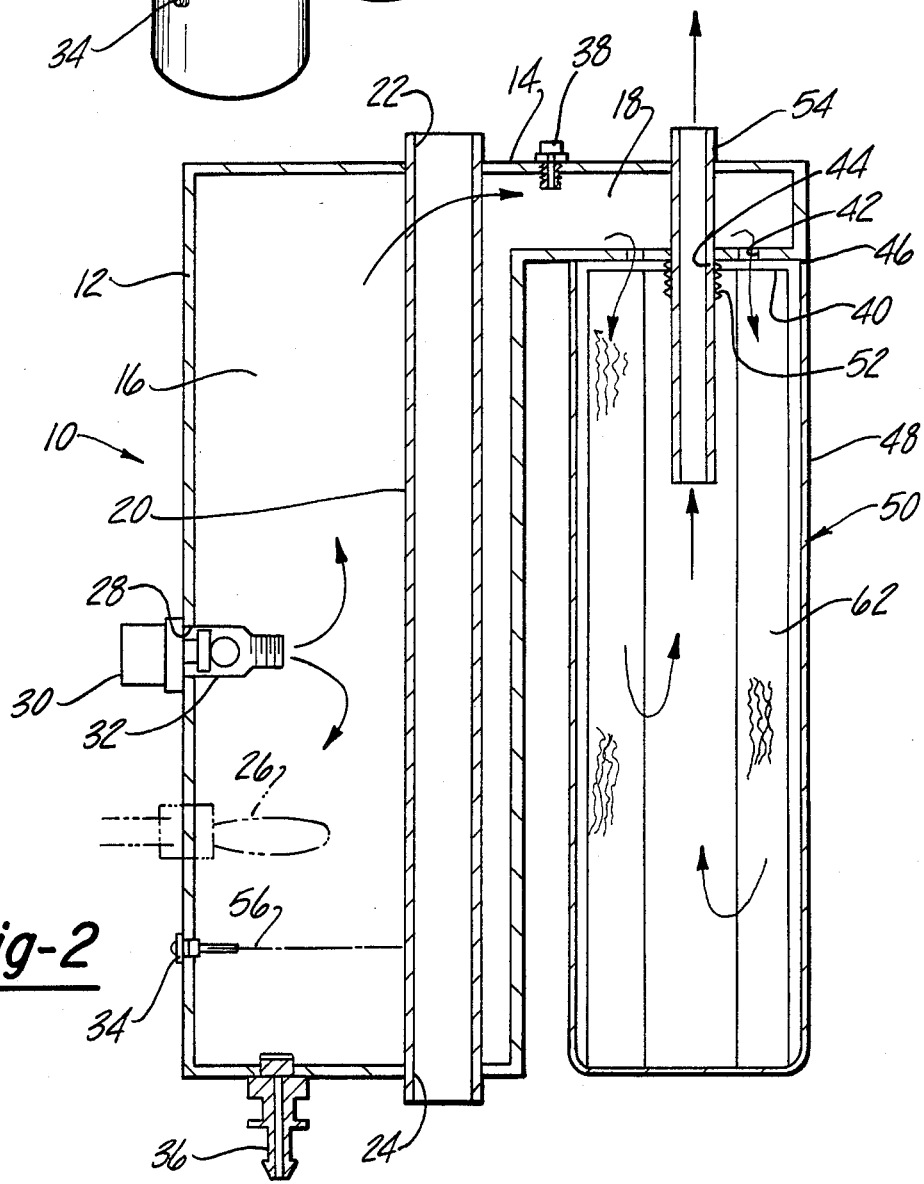
FIG. 2 is a cross-sectional view taken along lines 2—2 of FIG. 1 particularly showing the internal components and features of a fuel processor according to a first embodiment of this invention.

A fuel processor drive according to a first embodiment of this invention is generally designated by reference character 10 and is depicted by FIGS. 1 and 2. Fuel enters and exits fuel processor 10 as shown by the arrows in FIG. 1. Fuel processor 10 features housing 12 having an extended head portion 14 forming internal cavity 16 and head cavity 18. Internal cavity 16 is substantially unobstructed with the exception of the passage of heat tube 20, which has ends 22 and 24. Heat tube 20 is provided for usage conditions for fuel processor 10 which demand heating of the fuel to prevent fuel waxing and clouding. Fuel heating may be desired, however, even in conditions which do not create waxing and clouding problems since heating further enhances the fuel processor's function as a water separator. Heat tube 20, as shown by FIG. 2, is intended to provide a flow channel for the conduction of heated engine coolant fluid. When fuel heating is desired, however, any type of heating device such as electrical devices or any other devices causing heating by conduction, radiation or convection could be used. As shown by FIG. 2, an additional electrical heating element 26 is provided. Electrical heating element 26 may be employed in conjunction with heat tube 20 to enable the fuel processor device to be continually warmed without depending upon the existence of warm and circulating engine coolant fluid. Alternatively, electrical heating element 26 or another heat source may be provided as the sole source of heaat within the fuel processor device.

Housing 12 is generally elongated in a vertical direction. Within the side of housing 12 is side port 28 which provides a mounting location for fuel inlet fitting 30 which may be provided with a separate or integral check valve 32, which prevents reverse flow of fuel from occurring. Side port 28 and fuel inlet fitting 30 are preferably located in the central vertical portion of housing 12. Water sensor 34 is installed within housing 12 and may be of any of the types currently available, including those described by my previously identified issued patents and pending patent applications. Water sensor 34 acts to indicate the presence of an accumulated quantity of water or other impurity within the lower portion of housing 12. Sensor 34 can be employed either to provide a warning to the operator that the accumulated water should be drained from the fuel processor unit, or the sensor could be used to automatically cause removal of the accumulated water as described by my patent application Ser. No. 463,041, filed on Feb. 1, 1983. For the embodiment shown by FIGS. 1 and 2, draining of water or other impurities is achieved by manually actuating drain valve 36 located in the bottom surface of housing 12. Alternatively, automatic drain valves may be provided which are actuated in response to a signal generated by water sensor 34. Additionally, a temperature sensor may be installed within housing 12 to detect the temperature of fuel and/or accumulated water within fuel processor 10. The signal generated by the temperature sensor could be used to prevent operation of an automatic drain valve in conditions where damage to the drain valve could result due to the presence of ice crystals within the water being drained and/or to modulate electrical current or energy supplied to a fuel heater device such as electrical heating element 26 or any other heating device.

Housing 12 features horizontally extending head 14 located at the vertically upper end of housing 12, as shown by FIG. 2. Within the upper portion of housing 12 or head 14 is optional manually operate vent valve 38, which facilitates the draining of water or other impurities from fuel processor 10 when drain valve 36 is opened by allowing air to displace the fluid being discharged. Vent valve 38 is particularly useful where fuel processor 10 is used with negative pressure type fuel delivery systems, as will be more thoroughly explained below. The lower horizontal surface of head 14 forms filter mounting pad 40. Filter mounting pad 40 can be configured to accept a spin-on throw-away type filter as shown by FIG. 2 or the so-called conventional filter arrangement which employs a reusable canister and a throw-away internal element. A conventional filter is attached to the associated mounting pad by a through bolt. Either of these filter types are well-known to the prior art and are described by copending application Ser. No. 624,413, filed June 25, 1984. For either type of filter device, filter mounting pad 40 includes one or more fuel inlet ports 42, preferably arranged radially around fuel outlet port 44. Sealing means 46 are provided at the junction between canister 48 of filter assembly 50 and filter mounting pad 40 to prevent fuel leakage. Filter mounting pad 40 includes a centrally disposed threaded boss 52 which provides a means for attaching filter assembly 50 to the filter mounting pad. For use with so-called conventional type filters, filter mounting pad 40 would include an internally threaded bore for receiving the threaded through bolt. Fuel outlet tube 54 is connected and sealed within head 14 and preferably extends into the internal cavity of filter assembly 50 as shown by FIG. 2. The terminal end of outlet tube 54 preferably has threads or other fitting features enabling a fuel line to be attached thereto.

In operation, untreated fuel flows into fuel inlet fitting. Such flow results when the untreated fuel is supplied under pressure by an upstream pump in the case of a positive pressure-type fuel delivery system, or when fuel is drawn from the fuel processor device by a downstream pump when the fuel processor device is used in a negative pressure (vacuum) type fuel delivery system. Once untreated fuel flows into internal cavity 16, it is subject to the heating effect of heat tube 20 and/or electrical heating element 26, or any other type of heat element provided. As the fuel is heated, water globules will coalesce on heat tube 20, heater 26 and along the internal side surfaces of housing 12, or may directly precipitate out of solution. Once formed, water globules will flow to the lowermost portion of internal cavity 16, due to their relatively greater density. For use in warm climates, heating elements may be omitted and the water coalescing phenomena will occur without the use of external heat applied to the fuel processor device. Once the accummulated water has risen within the lower portion of housing 12 to a point designated by phantom line 56, a signal from water sensor 34 occurs. As stated previously, such a signal can be employed either to warn an operator or to automatically actuate a drain valve mechanism. Fuel flow out of internal cavity 16 proceeds within head cavity 18 and into filter assembly 50 via fuel inlet ports 42. As indicated by the arrows, the fuel passes through filter media 62 where particulates are trapped. Thereafter, the fuel enters the internal cavity of filter assembly 50 and flows out of the fuel processor device through outlet tube 54.

For the embodiment shown by FIG. 2, once water or other impurities have accumulated within the lower portion of internal cavity 16, the operator must manually drain this material from the fuel processor. When drain valve 36 is activated, material accumulating within the lower portion of internal cavity 16 is drained by the force of gravity. In positive pressure systems, such draining may be conducted while the fuel pump is operating, which would forceably expel fluid within fuel processor 10. In some instances, and particularly when fuel processor 10 is used with negative pressure fuel delivery systems, vent valve 38 is provided. With vent valve 38, draining is achieved by first unscrewing the vent valve to enable the interior of housing 12 to be exposed to the atmosphere. Vent valve 38 enables fluid displaced due to draining to be replaced by air. Check valve 32 is preferably provided in order to prevent any backflow of fuel into the fuel delivery lines connecting the fuel processor with a fuel supply tank. Typically, after the draining operation is completed, the upper portion of internal cavity 16 will be filled with air. In order to prevent ingestion of gasses into the fuel injection pump of the associated diesel fuel powered apparatus, outlet tube 54 extends a substantial distance downwardly into the central cavity of filter assembly 50 below the upper level of the fuel. Therefore, even if air exists within filter assembly 50, only liquid fuel will be discharged from outlet tube 54. Once the vent valve and drain valve are closed, the trapped air bubble within the upper portion of internal cavity 16 and filter assembly 50 will slowly disappear as these gases become dissolved within the fuel during operation of fuel processor 10.

Figure 3:
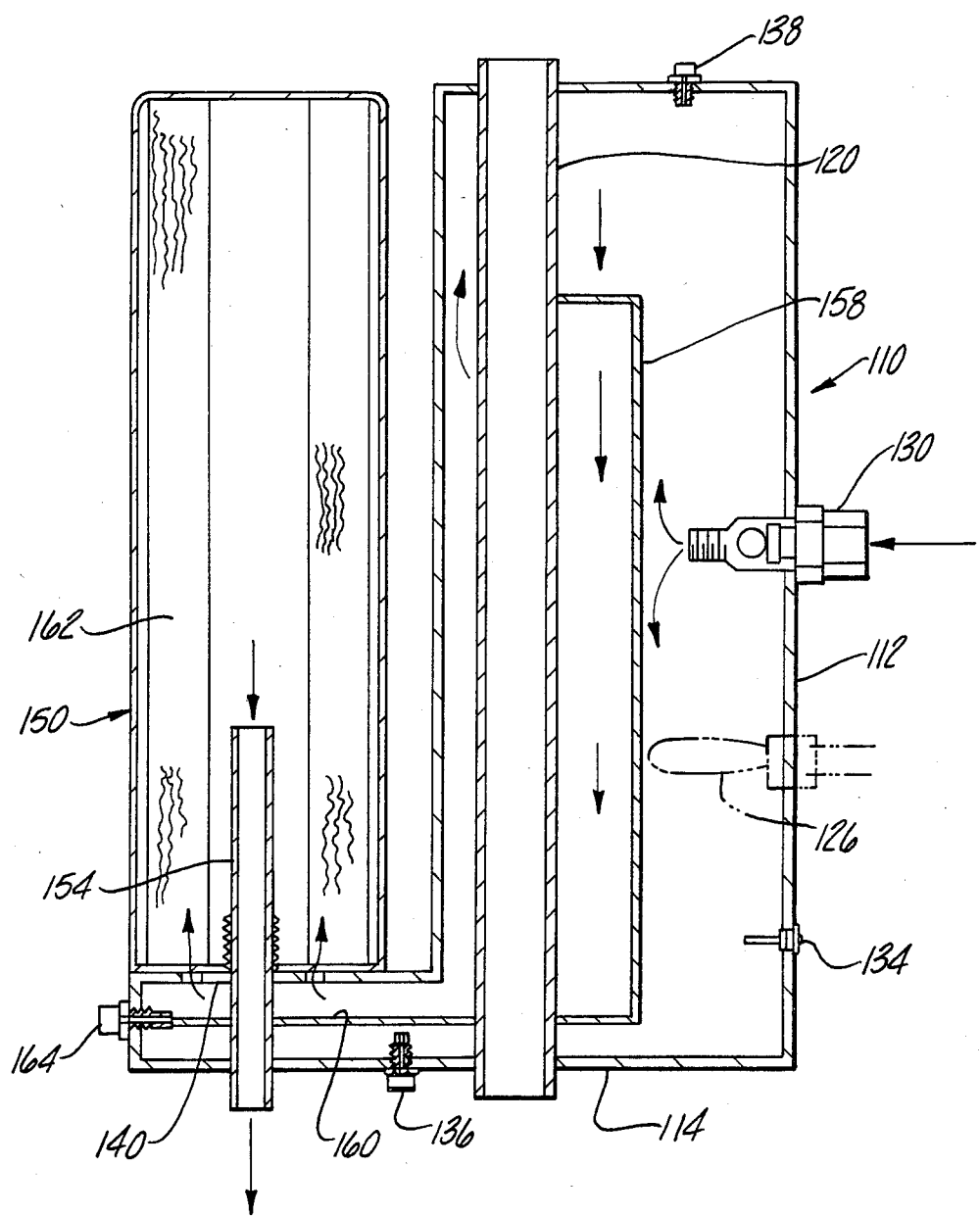
FIG. 3 is a cross-sectional view taken in the same direction as FIG. 2 showing the internal components and features of a fuel processor according to a second embodiment of this invention.

Now with particular reference to FIG. 3, a fuel processor device according to a second embodiment of this invention is described. Fuel processor 110 is substantially identical to fuel processor 10 described in connection with FIGS. 1 and 2 except that it is inverted as compared with the first embodiment. Particularly, head 114 is located along the vertically lower end of housing 112. Like fuel processor 10, fuel processor 110 includes heat tube 120, electrical heating element 116, fuel inlet fitting 130 and water sensor 134. Drain valve 136 is located in the lower portion of housing 112 or head 114 whereas vent valve 138 is located in an upper surface of housing 112. Fuel processor 110 differs, however, from fuel processor 10 in that fuel conduit 158 is internally disposed within housing 112. Conduit 158 is provided to ensure that fuel is withdrawn from the uppermost portion of housing 112 before it is conducted to filter assembly 150. Fuel within the upper portion of housing 112 is withdrawn since most or substantially all of the water in the fuel settles toward the bottom. Fuel conduit 158 terminates along a substantially horizontal floor surface 160 which is displaced above the lower surface of housing 112 and head 114 and is below filter mounting pad 140. Due to the fact that additional water may separate from the fuel once it is conducted into fuel conduit 158, additional water drainage means are preferably provided to remove water from its point of collection along floor 160. Therefore, drain valve 136 may be employed which simultaneously opens ports both in the lower portion of head 114 and floor 160, thereby draining water or other impurities collecting in those areas. Alternately, separate drain valves 136 and 164, as shown, are provided for each of these chambers. Outlet tube 154 extends a substantial distance upwardly into filter assembly 150 to ensure that additional water which coalesces within the filter assembly is not discharged into the fuel delivery circuit.

In operation, fuel processor 110 functions like that of fuel processor 10 in that fuel is conducted into fuel inlet fitting 130 within internal cavity 116. Thereafter, fuel enters fuel conduit 158 and into filter assembly 150.

Fuel processor 110 according to the second embodiment of this invention possesses several advantages over that described by the first embodiment. When fuel flow through filter assembly 150 is stopped, heavy particulates will tend to fall from contact with filter media element 162 of the filter assembly and will tend to collect in the lower portion of the filter assembly and/or the space between floor 160 and filter mounting pad 140, thereby enabling it to be removed by the opening of a drain valve in that area. Another advantage inherent in the design described by the second embodiment is the fact that an internal heater may be provided within head 114 and will, by natural heat flow convection, tend to warm both the fuel within housing 112 and that within filter assembly 150. Both fuel processors 10 and 110, however, possess the benefit of being very compact due to the side-by-side configuration. This configuration enables installation of a fuel processor device with a removable filter in areas where vertical height limitations are imposed, and enables the use of filters having larger filtration areas. Additionally, this configuration enables radiant heat transfer between housing 12 and 112 and the adjacent filter assembly.

As an additional feature, an insulated cover can be installed around the housing and filter assembly of either of the embodiments, thereby enhancing the thermal efficiency of the heating system used.

While the above description constitutes the preferred embodiments of the present invention, it will be appreciated that the invention is susceptible to modification, variation and change without departing from the proper scope and fair meaning of the accompanying claims.

What is claimed is:

1. A fuel processor for removing water and other impurities from fuel and adapted to accept a removable filter assembly having a filter canister and an internal filter element, said fuel processor comprising;
    a vertically elongated housing having a horizontally extending head communicating with the upper portion of said housing, said head having a lower surface forming a mounting pad for said filter assembly such that said filter assembly, when mounted to said mounting pad, is adjacent said housing in a side-by-side relationship therewith, said mounting pad having filter inlet and outlet ports;
    a fuel inlet located near the midpoint of said housing whereby said fuel flows into said housing where water and high density impurities settle into the lower portion of said housing, said fuel then being conducted through said mounting pad filter inlet ports and into said filter assembly;
    a fuel outlet communicating with said filter mounting pad outlet port; and
    drain means installed within said lower portion of said housing actuatable to drain said water and high density impurities from said housing.

2. The fuel processor according to claim 1 further comprising; a heat tube installed within said housing for conducting warmed fluid thereby heating fuel within said housing.

3. The fuel processor according to claim 1 further comprising; electrical heater means installed within said housing for heating fuel within said housing.

4. The fuel processor according to claim 1 wherein said removable filter assembly is a spin-on type defining a fuel outlet in the form of a threaded bore, said mounting pad having a threaded boss adapted to mesh with said threaded bore to receive said spin-on filter assembly.

5. The fuel processor according to claim 1 wherein said removable filter assembly is a conventional type and wherein said mounting pad forms a threaded bore adapted to receive a threaded through bolt for retaining said conventional filter assembly.

6. The fuel processor according to claim 1 wherein said housing further includes a water sensor for detecting the presence of a predetermined quantity of water or other impurities within said housing.

7. The fuel processor according to claim 1 wherein said fuel processor further includes a vent means.

8. The fuel processor according to claim 1 wherein said fuel inlet further includes check valve means which prevents reverse flow of fuel.

9. The fuel processor to claim 1 further comprising an outlet tube extending downwardly into said filter assembly a predetermined distance, said predetermined distance chosen to permit fluid to be drained from said housing without introducing air into said outlet tube.

10. A fuel processor for removing water and other impurities from fuel and adapted to accept a removable filter assembly having a filter canister and an internal filter element, said fuel processor comprising;
    a vertically elongated housing having a horizontally extending head communicating with the lower portion of said housing, said head having an upper surface forming a mounting pad for said filter assembly such that said filter assembly, when mounted to said mounting pad, is adjacent said housing in a side-by-side relationship therewith, said mounting pad having filter inlet and outlet ports;
    a fuel conduit having an inlet within the upper portion of said housing, and an outlet communicating with said mounting pad filter inlet port;
    a fuel inlet located near the midpoint of said housing whereby said fuel flows into said housing where water and high density impurities settle into the lower portion of said housing, said fuel then being conducted through said fuel conduit to said mounting pad inlet port and into said filter assembly;

a fuel outlet communicating with said filter mounted pad outlet port; and drain means installed within said lower portion of said housing actuatable to drain said water and high density impurities from said housing.

11. A fuel processor according to claim 10 further comprising second drain means actuatable to drain said water and other high density impurities from said head.

12. A fuel processor according to claim 10 further comprising; a heat tube installed within said housing for conducting warmed fluid thereby heating fuel within said housing.

13. A fuel processor according to claim 10 further comprising; electrical heater means installed within said housing for heating fuel within said housing.

14. A fuel processor according to claim 10 wherein said removable filter assembly is a spin-on type defining a fuel outlet in the form of a threaded bore, said mounting pad having a threaded boss adapted to mesh with said threaded bore to receive said spin-on filter assembly.

15. A fuel processor according to claim 10 wherein said removable filter assembly is a conventional type and wherein said mounting pad forms a threaded bore adapted to receive a threaded through bolt for retaining said conventional filter assembly.

16. A fuel processor according to claim 10 wherein said housing further includes a water sensor for detecting the presence of a predetermined quantity of water or other impurities within said housing.

17. A fuel processor according to claim 10 wherein said fuel processor further includes a vent means.

18. A fuel processor according to claim 10 wherein said fuel inlet further includes check valve means which prevents reverse flow of fuel.

19. A fuel processor according to claim 10 further comprising an outlet tube extending upwardly into said filter element.

20. A fuel processor according to claim 10 wherein said fuel conduit is disposed within said housing and head.

* * * * *

UNITED STATES PATENT AND TRADEMARK OFFICE
CERTIFICATE OF CORRECTION

PATENT NO. : 4,579,653

DATED : April 1, 1986

INVENTOR(S) : Leland L. Davis

It is certified that error appears in the above-identified patent and that said Letters Patent is hereby corrected as shown below:

Column 1, line 35, "in" should be -- by --.

Column 1, line 35, after "issued", delete "U.S.".

Column 2, line 24 "drive" should be -- device --.

Column 2, line 53, "heaat" should be -- heat --.

Column 3, line 9, "Alternatively" should read -- Alternately --.

Column 6, line 44, claim 9, after "processor" insert -- according --.

Column 7, line 3, claim 10, "mounted" should be -- mounting --.

Signed and Sealed this

Ninth Day of December, 1986

*Attest:*

DONALD J. QUIGG

*Attesting Officer*    *Commissioner of Patents and Trademarks*